C. KRARUP.
METHOD OF PACKING PULVERULENT MATERIALS IN RECEPTACLES.
APPLICATION FILED JAN. 11, 1916.
1,218,416.
Patented Mar. 6, 1917.
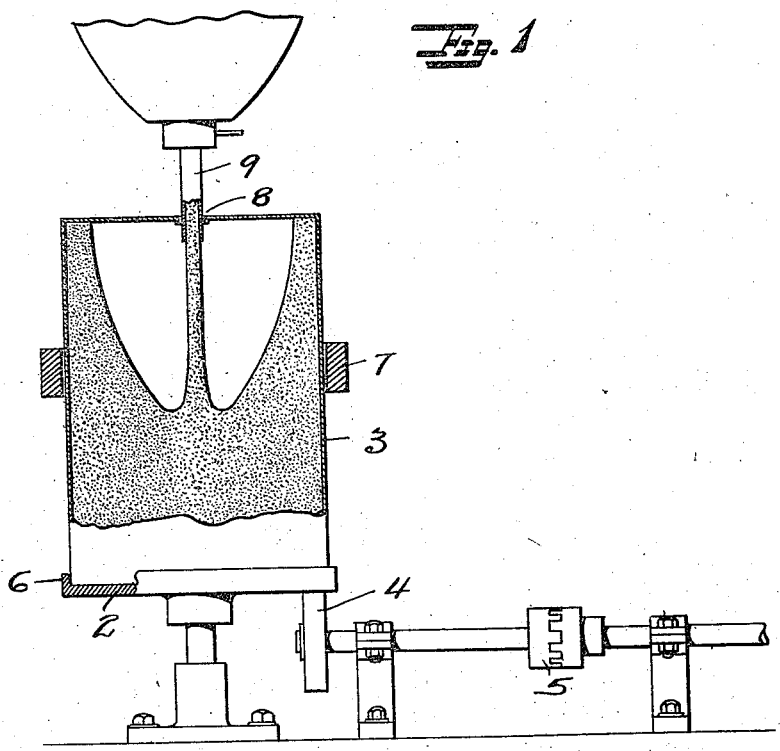
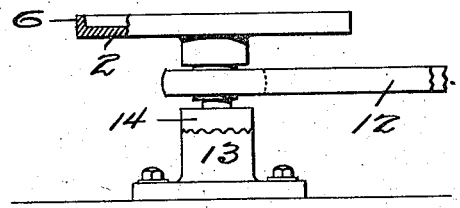
WITNESS
J. B. Gardner
INVENTOR.
C. KRARUP.
BY White & Frost
HIS ATTORNEYS.

UNITED STATES PATENT OFFICE.

CHRISTIAN KRARUP, OF SANTA CRUZ, CALIFORNIA, ASSIGNOR TO SANTA CRUZ PORTLAND CEMENT COMPANY, A CORPORATION OF CALIFORNIA.

METHOD OF PACKING PULVERULENT MATERIALS IN RECEPTACLES.

1,218,416.     Specification of Letters Patent.     Patented Mar. 6, 1917.

Application filed January 11, 1916. Serial No. 71,507.

*To all whom it may concern:*

Be it known that I, CHRISTIAN KRARUP, a citizen of the United States, and a resident of Santa Cruz, Santa Cruz county, State of California, have invented a certain new and useful Method of Packing Pulverulent Materials in Receptacles, of which the following is a specification.

The invention relates to a method of filling receptacles having impervious walls with pulverulent or finely divided materials.

An object of the invention is to provide a method of filling receptacles with pulverulent material and packing the material therein.

A further object of the invention is to provide a method of filling and packing pulverulent material in impervious receptacles having small inlet openings.

The invention possesses other advantageous features, which, with the foregoing, will be set forth at length in the following description where I shall outline in full one method of carrying out my process. In the accompanying drawings I have illustrated two forms of apparatus for carrying out the process of my invention, but it is to be understood that the invention is not limited to any particular apparatus.

The invention is particularly adapted for use in filling barrels or similar receptacles with pulverulent material, such as cement. Barrels for holding cement are made of sheet metal and are provided in the head with a relatively small opening, through which the cement is introduced. In order to fill the barrel within a reasonably short time, it is necessary to move the inflowing small stream of cement at a high velocity. This method of handling, however, causes a large percentage of air to be mixed with the cement in order that it will flow rapidly in a small stream and the cement becomes very loose and fluffy. In practice, the volume of the packed cement increases approximately one-third on account of the intermixture of the air. When this loose cement is introduced into the barrel, the barrel becomes filled before the required weight of cement has been introduced. Subsequently, the cement will settle and crowd out the intermixed air, resulting in a partly filled barrel which is objectionable for many reasons. In accordance with my invention, the cement is firmly packed in the barrel as it is introduced, thereby expelling the entrained air and permitting the desired amount of cement by weight to be introduced into the barrel. This I accomplish by subjecting the cement in the barrel, preferably as it is being introduced, to the action of centrifugal force, so that it is thoroughly compacted and the entrained air expelled.

Since the barrels are made of impervious material, an opening is provided at the inlet end of the barrel for allowing the air in the barrel and in the cement to escape as the cement is introduced and packed. This is usually accomplished by forming the cement inlet conduit of less diameter than the filling aperture, so that the air may pass out through the space between the conduit and the sides of the aperture. The centrifugal force may be applied in many ways, either by rotating the barrel around its own axis, or around any other axis and I do not limit myself to any specific means of producing the centrifugal force. When the barrel is rotated about its central axis, the filling aperture is placed in the center of the head. I have also found it advantageous, but not essential, to shake or jog the barrel in the direction of its axis during the time that the cement is being subjected to centrifugal force.

In said drawings:

Figure 1 is an elevation, partly in section, of an apparatus which may be used for carrying out the process of my invention.

Fig. 2 is a modified form of the apparatus.

The apparatus shown in Fig. 1 comprises a horizontally rotatable table 2 upon which the barrel 3 to be filled is placed, the table being arranged to rotate the barrel about its central axis. The table is rotated by frictional contact with the drive wheel 4, the shaft of which is provided with a suitable clutch 5, so that the rotation of the table may be stopped and started at will. The table is provided with a peripheral flange 6 which centers the barrel and the barrel is further held against displacement by a non-rotatable frame 7 surrounding the barrel.

The barrel is provided with a centrally disposed filling opening 8 in the upper head and the conduit 9 for the inflowing cement extends through the opening. Suitable means are provided for controlling the flow of cement through the filling conduit. The diameter of the conduit is less than the diameter of the opening, thereby providing an exit passage for the air. Due to the difference in specific gravity of the cement and air, the centrifugal force tends to pack the cement much more rapidly than can be accomplished when the force of gravity alone is utilized. Cement carrying a large percentage of air will act substantially the same as a liquid when subjected to centrifugal force and upon being deposited in the rotating barrel, it will be carried up on the inside of the barrel, its surface approximating the concave surface assumed by a liquid. This presents a large surface for the expulsion of the entrained air. Further, on account of the centrifugal action, the upper corner space in the barrel is filled and packed before the space around the filling opening, thereby completely filling the barrel and at the same time allowing a free passage for the exit of the air.

The amount of cement by weight which can be quickly packed in the barrel depends to some extent on the speed of rotation of the barrel and when employing the method in filling a barrel which is rotated about its own axis. I have found that a speed of 375 R. P. M. produces the desired result. This speed will vary, however, with the shape and size of the barrel and the amount of cement by weight that it is desirable to pack in a given volume.

In Fig. 2, the table 2 is rotated by the belt 12 and means are provided for shaking the table vertically during its rotation, the shaking motion assisting in liberating the entrained air. The bearing 13 for the table shaft has a radially corrugated upper surface which is engaged by a similarly formed collar 14 on the shaft, so that rotation is accompanied by a vertical shaking movement.

I claim:

1. The method of filling receptacles with pulverulent material which consists in subjecting the material in the receptacle to the action of centrifugal force.

2. The method of filling receptacles with pulverulent material, which consists in simultaneously feeding the material into the receptacle and subjecting it therein to the action of centrifugal force.

3. The method of filling receptacles with pulverulent material, mixed with air, which consists in feeding the mixture into the receptacle, subjecting it to the action of centrifugal force therein and permitting the displaced air to escape from the receptacle.

4. The method of filling receptacles with pulverulent material, which consists in subjecting the material in the receptacle to the action of centrifugal force and simultaneously shaking the receptacle.

5. The method of filling receptacles with pulverulent material which consists in simultaneously feeding the material into the receptacle, shaking the receptacle in the direction of its longitudinal axis and subjecting the material therein to the action of centrifugal force.

In testimony whereof, I have hereunto set my hand at Santa Cruz, California, this 4th day of January 1916.

CHRISTIAN KRARUP.

In presence of—
J. A. WEBER,
EDGAR M. WILSON.

Copies of this patent may be obtained for five cents each, by addressing the "Commissioner of Patents, Washington, D. C."